Patented July 4, 1950

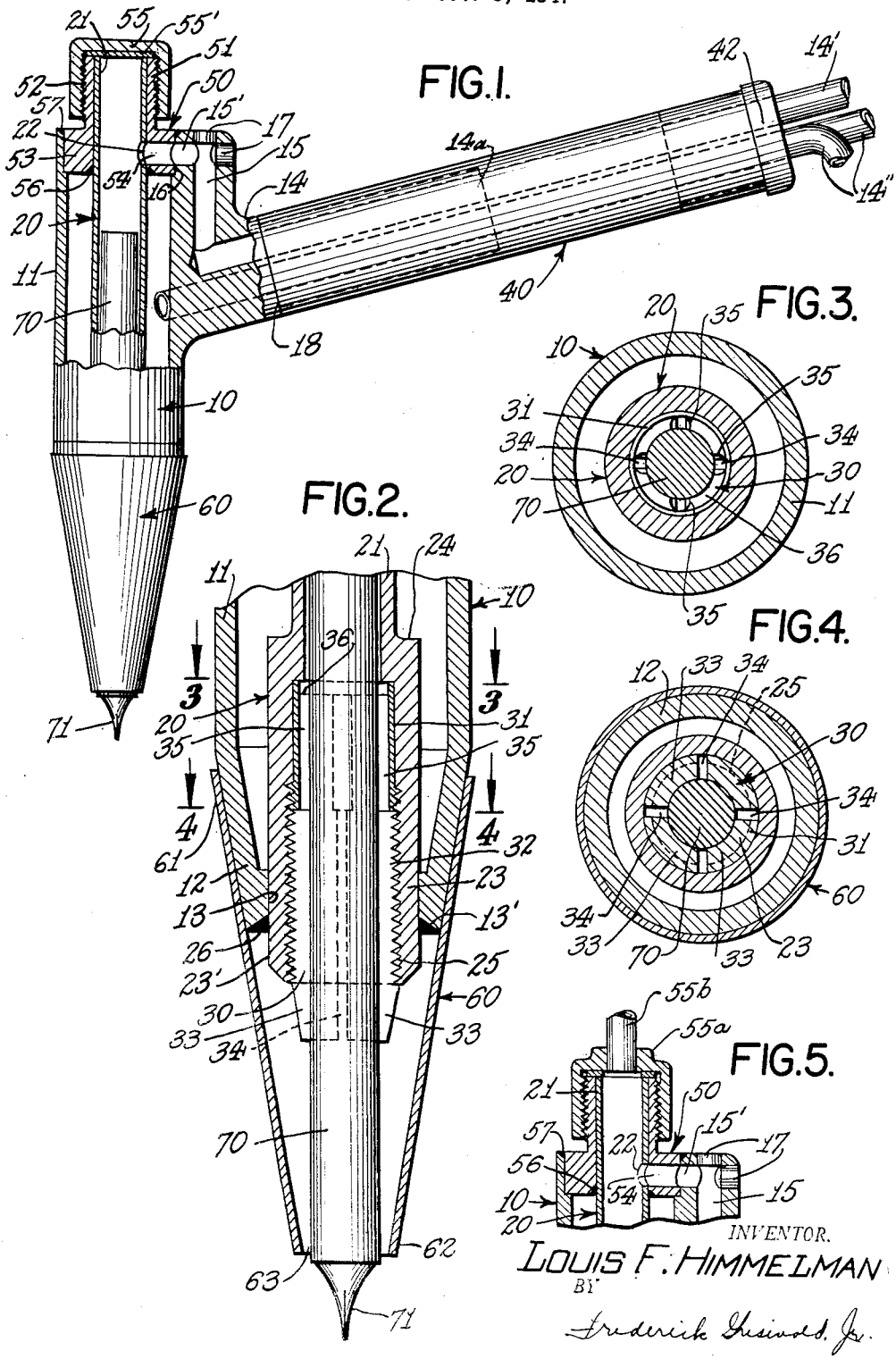

2,514,060

UNITED STATES PATENT OFFICE 2,514,060

ELECTRIC WELDING TORCH

Louis F. Himmelman, Teaneck, N. J.

Application October 3, 1947, Serial No. 777,645

3 Claims. (Cl. 219—14)

This invention relates to improvements in gas shielded electric welding torches, and, more particularly, to a hand torch which can be used in seam welding machines.

In the electric welding of thin sheet metals which are readily oxidizable and nitridable, such as aluminum, magnesium, and their alloys, it is customary to conduct the welding in an inert atmosphere. Where non-consumable or inert electrodes, such as tungsten wire, are used, an inert gas is caused to envelop the arc struck between the electrode and the weld metal or weld sheets so as to form a bubble or protective blanket around it. Owing to the high heat of the arc, the electrode carrier is mounted in a water cooled jacket.

It is among the features of novelty and advantage of the present invention to provide a light weight hand electric welding torch having a water cooled jacket, a sleeve for receiving the welding electrode, together with a friction chuck for securing the electrode, and means in the electrode holder to conduct inert gases to the tip of the welding electrode and envelop the arc formed in a bubble of inert gas.

The above and other desirable features of novelty and advantage of the present invention will be more clearly understod by reference to the accompanying drawings in which a preferred form of hand torch is shown by way of example only. In the drawings, like figures refer to similar parts throughout the several views, of which Fig. 1 is a side elevation of an improved hand torch with the upper portion of the gas feed and water jacket shown in section;

Fig. 2 is a fragmentary vertical section of the lower portion of the torch showing the assembly of parts;

Fig. 3 is a horizontal section taken on line 3—3 of Fig. 2, showing the mounting of the chuck and the orientation and cooperation of the gas delivery passages;

Fig. 4 is a horizontal cross-section on line 4—4 of Fig. 2, showing the details of the chuck jaws, and Fig. 5 is a vertical section of the top plug with a mounting attachment for use on machines.

Referring now to the drawings, the novel hand torch will be seen to comprise a torch body 10, a chuck holder 20, an electrode chuck 30, a handle 40, a top plug 50, and a shroud 60. The body portion 10 is generally cylindrical with an upper wall portion 11 tapering to a frusto-conical bottom 12 having a shouldered central opening 13, which is beveled at its end portion as indicated at 13'. An arm 14 is formed integrally with the body 11, and is drilled to provide a gas inlet 14' and a pair of water inlets 14''. The water inlet discharges directly into the cavity formed in the body 11. A vertical duct 15 is drilled to connect with the gas inlet 14', and a second, transverse duct 15' is drilled to connect the duct 15 with the chuck holder 20, as will be described more in detail hereinafter.

The chuck holder 20 comprises an elongated tubular member 21 having a side opening 22 near the top, an enlarged cylindrical bottom section 23, internally shouldered at 24, and having a screw thread 25 extending an appreciable distance from the bottom or open end.

The top plug 50 comprises a tubular body 51 externally threaded at 52 and having a shouldered flange portion 53 at the bottom. The bottom of the flange 53 is adapted to seat in a counterbore 16 formed in the inside wall of casing 11. The bottom section 53 of the plug is drilled, as indicated at 54, to provide an aperture which is aligned with duct 15' and aperture 22 to provide a gas conduit into the interior of chuck holder 20. A screw cap 55 is normally secured on and over top plug 50, a suitable gasket 55' being used to insure gas tightness. As shown in Fig. 5, a modified cap 55a has a gas inlet pipe 55b fitted therein to be used when the torch is mounted for machine use.

In assembling the torch, the top plug and the chuck holder are first joined by inserting the upper tubular end 21 of the holder into the plug so as to bring apertures 22 and 54 in register. A fillet weld 56 is formed at the joining edges of the bottom face of member 50 and the outer wall of member 20, thus joining these elements into a structural unit. The inner bottom edge of member 50 may be previously beveled to provide a groove with the chuck holder for the reception of suitable brazing or weld filler metal.

With the chuck holder and the top plug forming a structural unit, the lower end 23 of the chuck holder is inserted downwardly into the torch body 10 so that its outer wall 23' is snugly secured in and by the annular bottom end 13 of the torch body. A second fillet weld 26 is formed in and between the inward bevel 13' of the torch body and the outer surface of section 23 of the chuck holder, thus securing the torch body, the chuck holder, and the top plug as a structural unit comprising essentially a pair of concentric cylindrical members defining a central tubular gas delivery chamber and electrode receiver, and an outer, annular water cooling chamber which is hermetically sealed from the gas delivery line. A third fillet weld or brazed joint 57 is formed between the upper inner edge of wall 11 of member 10 and the adjacent edge of plug section 53 of plug 50. With this construction, the torch body serves as a mounting and water jacket for the combination gas delivery tube and chuck holder, and in a simple device which is readily formed from tubular parts with but three interconnecting ducts in the torch body itself. The open end of the ducts 15 and 15' are severally sealed off by plugs 17, which may be tapped in place or welded or otherwise hermetically secured therein.

The electrode chuck 30 comprises an upper tubular section 31 and a bottom screw threaded section 32 having chuck fingers 33 separated by longitudinal slots 34. The upper ends of the slots 34 are adapted to register with coaxial bored holes 35 in the upper tubular section 31 of the chuck 30. The upper tubular section 31 has its upper end counterbored, as shown at 36, to form a header so that passage of gas is assured, as will be described more in detail hereinafter.

The handle 14 of the torch body is of reduced diameter and forms a shoulder 18 with the torch body to receive the casing or handle 40 of the device. The member 40 is generally hollow and is fitted on member 14 with a drive fit or suitably secured with screws. The other end of the handle casing 40 receives a handle plug 42 which is suitably apertured to receive the gas line 14' and the water ducts 14".

The above described torch holder is characterized by the fact that with a given torch body and chuck holder suitably combined into a structural entity, variations in size of electrodes can be readily taken care of by using interchangeable electrode chucks of uniform over-all dimensions but varying in internal diameter. The hole sizes of the chucks may vary from $\frac{1}{16}$" to $\frac{5}{16}$", thus accommodating all standard wire electrodes in a drive friction fit. Desirably, the upper end of the chuck holder has an internal diameter of $\frac{3}{8}$ of an inch, providing a 32nd of an inch clearance all around when the maximum size electrode ($\frac{5}{16}$ of an inch) is inserted therein. With the electrodes tightly fitted in the sleeve portion 31 of the chuck, the gas flowing in tube 20 around the electrode therein will flow into header 36 and thence through the passages 35 downwardly and through the saw cuts 34 until discharged between the lower ends of the chuck fingers 33 into the chamber formed by conical shroud 60 whose large end 61 is snugly fitted over and on the tapering bottom wall 12 of casing 10, and whose truncated smaller end 62 defines an annular channel 63 with electrode 70 which is driven in and held by the chuck. The arc-forming tip 71 of the electrode will be encompassed or blanketed by a stream of gas issuing through the annular discharge aperture 63 so that the arc will always be operating in a bubble of the discharged gas. Normally, gases such as helium, argon and other protective gases are used, depending on the materials being welded and their reactivity. Thus, with magnesium alloys which are reactive to nitrogen, it is preferred to use argon as the blanketing gas.

The electric welding torch described above is intended for hand use. However, due to its simplicity of construction and the demountability of the cap 55, it can be readily adapted for use in seam welding machines by removing the cap 55 and mounting the torch body on a welding machine having an inert gas inlet 55b to which is secured a threaded cap 55a into which the top plug 50 is threaded in the usual manner. When the torch is mounted for machine use, the handle 40 and handle plug 42 are removed together with the flexible gas inlet tube leading into gas inlet duct 14' in the handle, and the end of the duct 14' in the handle is plugged. Thus, it will be seen that no alteration or modification of the torch or its essential working parts is required to effect the change-over from a hand torch to a machine torch. When the machine mounted torch is to be used again as a hand torch, the torch body will be screwed out of the cap 55a and the screw cap 55 replaced on the top plug. The plug is removed from the duct 14' at the end 14a of the handle section 14, and the flexible lead through the handle plug and handle into the duct is restored.

It will now be seen that there has been provided a novel combination hand and machine electric torch for arc welding using non-consumable electrodes such as tungsten wire, which torch is water-cooled and in which special arrangements are made for providing a protective bubble or sheath of inert gas around and over the arc and the weld metal melted by the arc.

What is claimed is:

1. An electric welding torch, including, in combination, a hollow body formed with a water inlet orifice and a water outlet orifice, a tubular chuck holder positioned within the body and making a water tight connection at the bottom and at the top of the body and formed with a side opening near the top thereof, said chuck holder internally threaded at the lower end thereof, a handle integral with the body, said handle formed with ducts, two of said ducts opening directly into said body into the space surrounding said chuck holder, a third of said ducts connecting with the side opening in the chuck holder, an externally screw threaded chuck screwed into the threaded end of the chuck holder, said chuck being formed with longitudinal slots and adapted to receive and hold an electrode protruding in both directions therefrom and of a diameter less than the internal diameter of the chuck holder and a hollow truncated conical shroud positioned on the lower end of the body adapted to surround a protruding electrode with a space therebetween whereby when water is allowed to circulate through the body from water inlet orifice to water outlet orifice and gas through the third of above mentioned ducts the body and electrode are cooled and the electrode tip is surrounded by gas.

2. An electric welding torch, including, in combination, a hollow body formed with a water inlet orifice and a water outlet orifice, a tubular chuck holder positioned within the body and making a water tight connection at the bottom and at the top of the body and formed with a side opening near the top thereof, said chuck holder internally threaded at the lower end thereof, a handle integral with the body, said handle formed with ducts, two of said ducts opening directly into said body into the space surrounding said chuck holder, a third of said ducts connecting with the side opening in the chuck holder, a chuck, said chuck being provided with an external screw thread, said screw thread serving to hold the chuck in the chuck holder and to increase the electrical conductivity of contacting surfaces of said chuck and chuck holder, said chuck formed with a counterbore portion at one end and with slots lengthwise of the chuck whereby the flow of gas is not interrupted by the chuck and electrode held thereby, said chuck adapted to hold an electrode protruding in both directions therefrom, a hollow truncated conical shroud positioned on the lower end of the body adapted to surround a protruding electrode with a space therebetween whereby when water is allowed to circulate through the body from water inlet orifice to water outlet orifice and gas through the third of the above mentioned ducts the body and electrode are cooled and electrode tip is surrounded by gas.

3. An electric welding torch, including, in combination, a hollow body, a tubular chuck holder positioned within the body and making connection at the bottom and at the top of the body and formed with a side opening near the top thereof, said chuck holder internally threaded at the lower end thereof, a handle integral with the body, said handle formed with a duct, said duct connecting with the side opening in the chuck holder, an externally screw-threaded chuck screwed into the end of the chuck holder, said chuck being formed with longitudinal slots and adapted to receive and hold an electrode protruding in both directions therefrom and of a diameter less than the internal diameter of the chuck holder, said chuck further formed with a counterbore portion at one end and with bores connecting the counterbore portion and the slots of the chuck whereby flow of gas is allowed through the chuck and along the electrode held thereby, a hollow truncated conical shroud positioned on the lower end of the body surrounding a protruding electrode with a space therebetween whereby when gas is furnished to said duct the electrode tip is surrounded by gas.

LOUIS F. HIMMELMAN.

REFERENCES CITED

The following references are of record in the file of this patent:

UNITED STATES PATENTS

| Number | Name | Date |
| --- | --- | --- |
| 1,309,696 | Roberts et al. | July 15, 1919 |
| 1,707,433 | Hand | Apr. 2, 1929 |
| 1,716,614 | Bergman | June 11, 1929 |
| 1,869,328 | Tobey | July 26, 1932 |
| 1,911,033 | Nagashev | May 23, 1933 |
| 2,014,226 | Catlett | Sept. 10, 1935 |
| 2,063,467 | Southgate | Dec. 8, 1936 |
| 2,310,164 | Prendergast et al. | Feb. 2, 1943 |
| 2,314,628 | Pavlecka | Mar. 23, 1943 |
| 2,361,896 | Yeadon | Oct. 31, 1944 |
| 2,376,265 | Meredith | May 15, 1945 |
| 2,400,285 | Buck | May 14, 1946 |
| 2,468,804 | Breymeier | May 3, 1949 |
| 2,468,805 | Herbst | May 3, 1949 |
| 2,468,806 | Pilia | May 3, 1949 |
| 2,468,807 | Herbst | May 3, 1949 |
| 2,468,808 | Drake | May 3, 1949 |

OTHER REFERENCES

The Welding Journal, May, 1947, pages 410 and 411.